Sept. 15, 1925.
H. D. HUKILL ET AL
1,553,614
MOTOR VEHICLE CONTROL MECHANISM
Filed Jan. 11, 1924
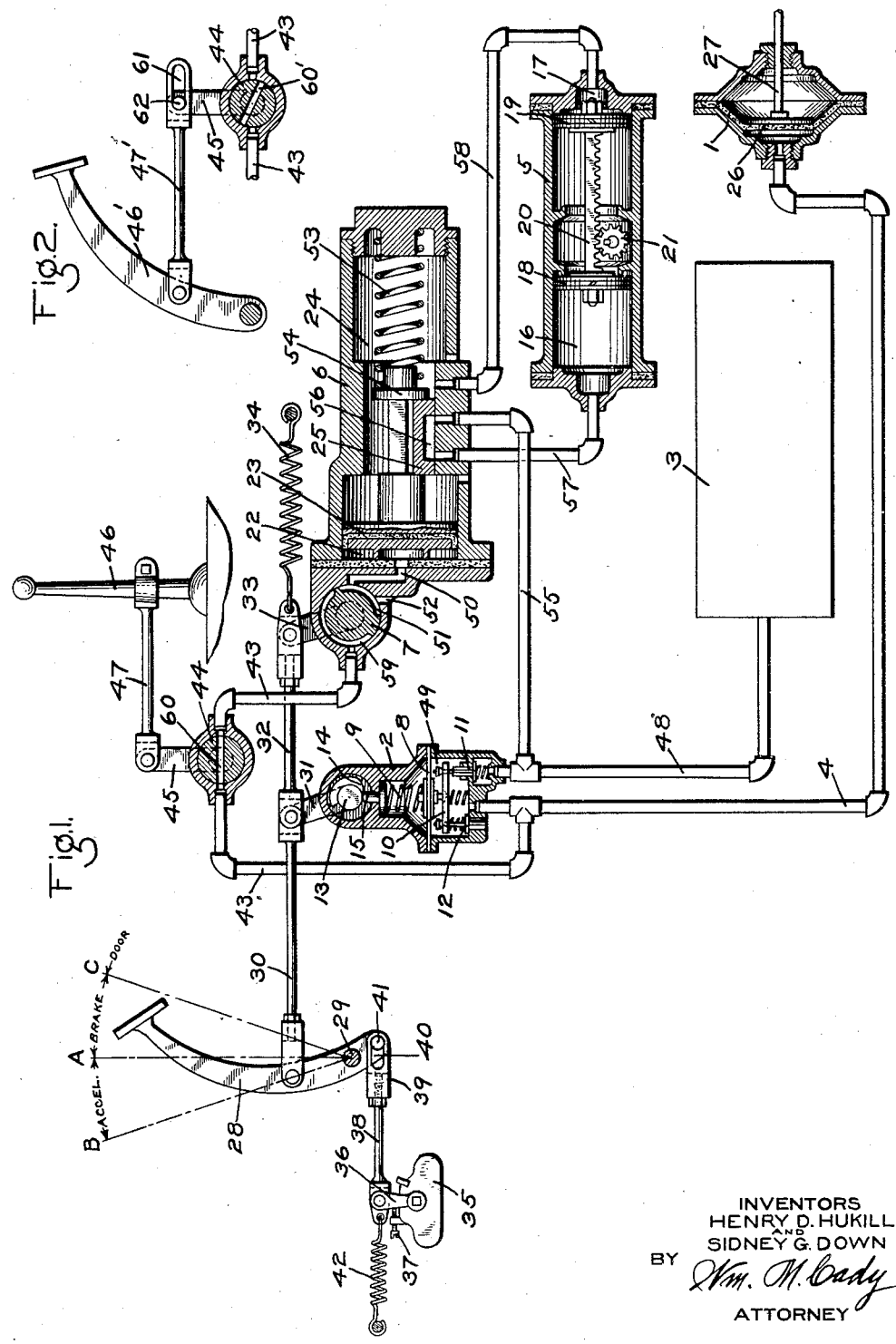
INVENTORS
HENRY D. HUKILL
AND
SIDNEY G. DOWN
BY *Wm. M. Cady*
ATTORNEY Patented Sept. 15, 1925.

1,553,614

UNITED STATES PATENT OFFICE.

HENRY D. HUKILL AND SIDNEY G. DOWN, OF PITTSBURGH, PENNSYLVANIA, ASSIGNORS TO THE WESTINGHOUSE AIR BRAKE COMPANY, OF WILMERDING, PENNSYLVANIA, A CORPORATION OF PENNSYLVANIA.

MOTOR-VEHICLE CONTROL MECHANISM.

Application filed January 11, 1924. Serial No. 685,602.

*To all whom it may concern:*

Be it known that we, HENRY D. HUKILL and SIDNEY G. DOWN, both citizens of the United States, and residents of Pittsburgh, in the county of Allegheny, State of Pennsylvania, have jointly invented certain new and useful Improvements in Motor-Vehicle Control Mechanism, of which the following is a specification.

This invention relates to vehicle brake and door controlling apparatus, and more particularly as applied to passenger buses of the automotive vehicle type.

One object of our invention is to provide a vehicle controlling means in which the operation of a single lever by the operator will be effective to control the accelerator, the brakes, and the vehicle doors.

Another object is to provide means for applying the brakes, shutting off power, and opening the car door when the operator becomes incapacitated or otherwise relinquishes control.

In the accompanying drawing; Fig. 1 is a diagrammatic view of a car door, brake, and accelerator controlling apparatus embodying our invention; and Fig. 2 a view illustrating a slight modification of our invention.

As shown in Fig. 1, the apparatus may comprise a fluid pressure brake mechanism including a brake chamber 1, a brake valve device 2, a reservoir 3 containing fluid under pressure, and a brake application and release pipe 4.

The door controlling mechanism may comprise a pneumatic door engine 5, a valve device 6 for controlling the fluid pressure for operating the door engine, and a valve 7 for controlling the fluid pressure on said valve device.

The brake valve device 2 is preferably of the type comprising a casing containing a flexible diaphragm 8, subject on one side to the pressure of a spring 9 and provided at the other side with a crosshead 10 adapted to operate a supply valve 11 and a release valve 12 for controlling the admission and release of fluid under pressure to and from the pipe 4. The compression of spring 9 is varied by means of a rotatable member 13 having a cam face 14 adapted to engage a spring engaging stem 15.

The door engine 5 may comprise a casing having piston chambers 16 and 17 containing respective piston heads 18 and 19. Said pistons are connected together by a rack bar 20, the teeth of which mesh with the teeth of a pinion 21. The rotation of said pinion is adapted to effect the opening and closing of the vehicle doors.

The door controlling valve device 6 may comprise a casing having a piston chamber 22 containing a piston 23 and a valve chamber 24 containing a slide valve 25 adapted to be operated by piston 23, for controlling the fluid pressure in piston chambers 16 and 17.

The brake chamber 1 contains a flexible diaphragm 26 adapted to operate a rod 27 for applying the brakes when fluid under pressure is supplied through pipe 4 to the fluid pressure side of the diaphragm.

A foot operated pedal lever 28 is provided, which turns on a pivot pin 29, and said lever is operatively connected through a rod 30 to an arm 31 for operating the cam member 13 and through a rod 32, extending from the pin connection to the arm 31, with an arm 33 for rotating the valve 7. A spring 34, having one end fixed, is secured to the rod 32 and resists movement of the lever 28 toward the left.

The reference numeral 35 indicates the usual carburetor or accelerator mechanism of an automotive vehicle and having an operating arm 36 movable toward the right for varying the supply of liquid fuel to the vehicle motor, movement toward the left being limited by the usual adjustable stop 37. The arm 36 is pivotally connected to a rod 38, the other end of which is provided with a jaw 39 having an elongated slot 40 for receiving a pin 41 carried by the end of the pedal lever 28. A spring 42 having one end fixed and the other end connected to rod 38 tends to pull the arm 36 toward the left against the stop 37.

A pipe 43 connects the pipe 4 with the valve 7 and preferably, though not necessarily, a valve 44 may be interposed in pipe 43 to control communication through said pipe. The valve 44 is provided with an operating arm 45 which may be operatively connected to the gear shift lever 46 by means of a rod 47.

In operation, we will assume that the pedal lever 28 is being held by the foot of the operator in the position shown in Fig. 1, this position being also represented by the dot and dash line A. The spring 34 is now under tension and tends to pull the lever 28 toward the right.

In this position, the accelerator arm 36 is in its idling position and to operate the accelerator for running the car, the pedal lever 28 is pushed toward the left from position A toward position B.

If it is desired to apply the brakes, the pressure of the foot on the lever 28 is relieved to permit movement of the lever from position A toward position C. The arm 31 is then operated to rotate the member 13, so that the cam face 14 engages the stem 15 and thus effects a certain compression of the spring 9. The compression of spring 9 operates to depress the diaphragm 8, so as to open the supply valve 11, the exhaust valve 12 being already closed. Fluid under pressure is then supplied from the reservoir 3 through pipe 48 to the diaphragm chamber 49 and thence through pipe 4 to the brake chamber 1, so as to operate the diaphragm 26 to effect an application of the brakes.

During this movement of the foot pedal 28, the pin 41 rides in the slot 40, so that the accelerator arm 36 is not operated. In the movement of the pedal lever 28 between the positions A and C, the arm 33 is also rotated, but the piston chamber 22 of the door controlling valve device remains connected to the atmosphere by way of passage 50, cavity 51 in valve 7 and exhaust port 52.

With the piston chamber 22 at atmospheric pressure, a spring 53 acting on the piston stem 54 of the piston 23 operates to hold the piston 23 and the slide valve 25 in the door closed position, as shown in the drawing. In this position, fluid under pressure is supplied to the piston chamber 16 of the door closing piston 18 through pipe 48, pipe 55, cavity 56 in slide valve 25, and pipe 57. Pipe 58, leading to the piston chamber 17 of the door opening piston 19 is now open to valve chamber 24 which is always at atmospheric pressure, so that the piston chamber 17 is also at atmospheric pressure and consequently the pistons 18 and 19 will be held in the door closing position.

If it is desired to open the vehicle doors, the pedal lever 28 must be moved toward the right beyond the piston C. When this is done, the valve 7 is rotated so that the cavity 51 is disconnected from passage 50, while said passage is connected to a cavity 59. Said cavity is also connected to pipe 43. If the gear shift lever 46 is in neutral position, as shown in the drawing, communication through pipe 43 is established by way of port 60 in valve 44, so that, the brakes having been applied, fluid under pressure in the pipe 4 is supplied to the piston chamber 22, and the piston 23 is thereby operated to shift the slide valve 25 to its door opening position.

In this position, the door closing pipe 57 is opened to the valve chamber 24 and the atmosphere, while cavity 56 connects pipe 58 with pipe 55. Fluid under pressure is therefore supplied to piston chamber 17 so that the pistons 19 and 18 will be shifted to the door opening position.

If the gear shift lever is not in its neutral position, communication through pipe 43 will be closed, so that it is evident the vehicle doors cannot be opened unless the gear shift lever is first operated to disconnect the gears by movement to neutral position.

If while the vehicle is running, the operator should remove his foot from the pedal lever 28, either by accident or design or by reason of the operator becoming incapacitated, the spring 34 will at once shift the pedal lever 28 and its connected parts to the right, so as to effect a full application of the brakes by the operation of the arm 31.

At the same time, the accelerator is operated to cut off the fuel supply to the vehicle motor, but it will be noted that the valve device 6 is not operated to effect the opening of the car doors, unless someone shifts the gear shift lever to its neutral position.

In some cases, it may be preferred to omit the interlock with the gear shift lever, and in such case, communication being constantly open from the brake pipe 4 to the valve 7, it will be evident that the doors will be opened when the brakes are applied and the pedal lever is allowed to move to the right beyond the position C.

According to another form of our invention, communication through pipe 43 may be controlled by the movement of the usual clutch controlling lever, as shown in Fig. 2, instead of by the movement of the gear shift lever. As shown in Fig. 2, the clutch lever 46' is operatively connected to the arm 45 by rod 47' having a jaw at one end provided with an elongated slot 61 in which a pin 62, carried by the arm 45, engages. With this construction, the clutch lever 46' must be moved to throw out the clutch, before communication is opened, by way of port 60', through the pipe 43. The first movement of the lever 46', sufficient to throw out the clutch, is taken up by the riding of pin 62 in the slot 61 and then said pin is operated to effect the rotation of the arm 45 and the valve 44 so as to cause the port 60' to establish communication through the pipe 43.

Having now described our invention, what we claim as new and desire to secure by Letters Patent, is:—

1. In a vehicle brake and door controlling mechanism, the combination with a fluid pressure brake and fluid pressure means for controlling a vehicle door, of valve means for controlling the fluid pressure on said door controlling means and a single manually controlled element for operating said valve and for controlling the fluid pressure brake.

2. In a vehicle controlling mechanism, the combination with a fluid pressure brake and an accelerator for the vehicle motor, of a single manually controlled element for operating said accelerator and for controlling the fluid pressure brake.

3. In a vehicle controlling mechanism, the combination with a fluid pressure brake, an accelerator for the vehicle motor, and fluid pressure means for controlling a vehicle door, of a single manually operated element for controlling the fluid pressure brake, the accelerator, and said door controlling means.

4. In a vehicle controlling mechanism, the combination with an accelerator for the vehicle motor and a fluid pressure brake, of a pedal lever for operating said accelerator and for controlling said fluid pressure brake, said pedal lever having a movement relative to the accelerator in controlling the fluid pressure brake.

5. In a vehicle brake controlling mechanism, the combination with a fluid pressure brake including a brake valve device for controlling the application and release of the brakes, of a pedal lever for operating said brake valve device and means for shifting said brake valve device to brake application position upon release of the pedal lever.

6. In a vehicle controlling mechanism, the combination with a fluid pressure brake including a brake valve device for controlling the application and release of the brakes and an accelerator for the motor vehicle, of a pedal lever for operating said brake valve device and said accelerator, and means for shifting said brake valve device to brake application position and said accelerator to cut off power upon release of the pedal lever.

7. In a vehicle controlling mechanism, the combination with an accelerator for controlling the vehicle motor, a fluid pressure brake including a brake valve device for controlling the application and release of the brakes, and a fluid pressure door controlling means, of a pedal lever for operating said accelerator, said brake valve device, and said door controlling means, and means for shifting said accelerator to cut off power, said brake valve device to brake application position, and said door controlling means to effect the opening of the vehicle door, upon release of the pedal lever.

8. In a vehicle controlling mechanism, the combination with a brake controlling device, a door controlling device, and an accelerator for the vehicle motor, of a foot controlled lever operatively connected to said brake controlling device, said door controlling device, and the accelerator, so that the movement of the lever through one arc is adapted to operate the accelerator with the brakes released, through another arc to operate the brake controlling device to apply the brakes with the accelerator in power off position, and through another arc for operating said door controlling device to effect the opening of the vehicle door.

9. In a motor vehicle controlling mechanism, the combination with a valve device for controlling the application and release of the brakes, a fluid operated valve device for controlling the opening and closing of the vehicle doors, and a valve for controlling the fluid on said door controlling valve device, of a manually operable lever for operating said brake controlling valve device and said valve, an additional manually operable element, and a valve operated by said additional lever for controlling communication through which fluid is supplied to said door controlling valve.

10. In a motor vehicle controlling mechanism, the combination with a valve device for controlling the application and release of the brakes, a fluid operated valve device for controlling the opening and closing of the vehicle doors, and a valve for controlling the fluid on said door controlling valve device, of a manually operable lever for operating said brake controlling valve device and said valve, a gear shift lever and a valve operated by said gear shift lever for controlling communication through which fluid is supplied to said door controlling valve.

In testimony whereof we have hereunto set our hands.

HENRY D. HUKILL.
SIDNEY G. DOWN.